(12) United States Patent
Chen et al.

(10) Patent No.: US 11,975,346 B2
(45) Date of Patent: May 7, 2024

(54) ON-LINE AUTOMATIC CLEANING APPARATUS OF SLIT EXTRUSION TYPE COATING DIE FOR LITHIUM BATTERY AND CLEANING METHOD THEREOF

(71) Applicant: JIANGSU KATOP AUTOMATION CO., LTD, Liyang (CN)

(72) Inventors: Donghua Chen, Liyang (CN); Zhenhua Fan, Liyang (CN)

(73) Assignee: JIANGSU KATOP AUTOMATION CO., LTD, Liyang (CN)

( * ) Notice: Subject to any disclaimer, the term of this patent is extended or adjusted under 35 U.S.C. 154(b) by 303 days.

(21) Appl. No.: 17/554,566

(22) Filed: Dec. 17, 2021

(65) Prior Publication Data

US 2022/0105668 A1    Apr. 7, 2022

Related U.S. Application Data

(63) Continuation of application No. PCT/CN2020/092462, filed on May 29, 2020.

(30) Foreign Application Priority Data

May 31, 2019 (CN) .......................... 201910470439.3

(51) Int. Cl.
    *B05B 15/55*    (2018.01)
    *B08B 3/08*    (2006.01)
    (Continued)

(52) U.S. Cl.
    CPC ............... *B05B 15/55* (2018.02); *B08B 3/08* (2013.01); *B29C 48/08* (2019.02); *B29C 48/272* (2019.02);
    (Continued)

(58) Field of Classification Search
    None
    See application file for complete search history.

(56) References Cited

FOREIGN PATENT DOCUMENTS

| CN | 103846183 A | 6/2014 |
|---|---|---|
| CN | 206810593 U | 12/2017 |
| JP | 2015107478 | * 6/2015 |

OTHER PUBLICATIONS

Translation of JP2015107478 by Kosemura, published Jun. 11, 2015.*

* cited by examiner

*Primary Examiner* — Mikhail Kornakov
*Assistant Examiner* — Ryan L Coleman
(74) *Attorney, Agent, or Firm* — WPAT, P.C

(57) ABSTRACT

An on-line automatic cleaning apparatus of slit extrusion type coating die for lithium battery and a method associated therewith are provided. The cleaning apparatus includes: a die lip, a coating steel roller, and a cleaning mechanism disposed therebetween. The cleaning mechanism includes a cleaning chamber which includes elongated sealing strips and a flow-guiding arc groove. Front and rear ends of the cleaning chamber are connected to an inlet sealing plate and an outlet sealing plate respectively. The flow-guiding arc groove is in contact with and presses upper and lower sloped surfaces of the die lip through the elongated sealing strips to seal and thereby define a closed cleaning tunnel. The inlet and outlet sealing plates are in contact with and press two ends of the closed cleaning tunnel respectively for circumferential sealing. An inlet and an outlet are connected to pipes having solenoid valves installed thereon.

10 Claims, 2 Drawing Sheets

(51) Int. Cl.
  _B29C 48/08_ (2019.01)
  _B29C 48/27_ (2019.01)
  _B29C 48/305_ (2019.01)
  _H01M 10/052_ (2010.01)
  _H01M 10/0585_ (2010.01)
(52) U.S. Cl.
  CPC ......... _B29C 48/305_ (2019.02); _H01M 10/052_ (2013.01); _H01M 10/0585_ (2013.01)

ON-LINE AUTOMATIC CLEANING APPARATUS OF SLIT EXTRUSION TYPE COATING DIE FOR LITHIUM BATTERY AND CLEANING METHOD THEREOF

TECHNICAL FIELD

The invention relates to the field of slit extrusion type coating technology, and more particularly to an on-line automatic cleaning apparatus of slit extrusion type coating die for lithium battery and a cleaning method thereof.

DESCRIPTION OF RELATED ART

Nowadays, lithium batteries have developed rapidly in the new energy industry, from initial lithium batteries of mobile phones to current power batteries of new energy vehicles; and the power batteries mostly adopt a slit extrusion type method. As a precise wet coating technology, a working principle of a slit extrusion type coating is that a coating slurry is extruded and ejected out along a slit of a coating die under a certain pressure and a certain flow rate and then transferred onto a substrate. The slit extrusion type coating has advantages of fast coating speed, high precision, uniform wet thickness and closed coating system. It can prevent pollutants from entering in the coating process, has high slurry utilization rate, can maintain the stability of slurry properties, and can adapt to different slurry viscosities and solid content ranges. Compared with other coating processes, it has stronger practicability. However, due to a first inspection of coating parameters, belt breakage, belt replacement, insufficient slurry supply and other reasons, some cases will be caused as follows when the die needs to stop the coating operation.

Case 1: when the coating operation is stopped for a short time within 20 minutes, a coating control system switches to a back-flow state, the die is retreated, the slurry directly flows back from an external pipe for circulation without passing inside of the die, the slurry in front and rear cavities inside the die is stationary and easy to deposit, and the slurry in the slit at a lip will soon dry to a certain depth when in contact with the air.

Case 2: when the coating operation is stopped for a long time of more than twenty minutes, the coating control system first switches to the back-flow state, the die is retreated, and the lip is manually pasted and sealed by an entire tape. A foam sponge with one inch thickness is prepared, and the lip of the die is moved slowly towards a transfer steel roller, so that the foam sponge is sandwiched between the lip of the die and the transfer steel roller to further press the seal tape to prevent leakage, and then a back-flow valve on the die is opened manually, and the coating control system switches to a coating state. At this time, the slurry flows back through the rear cavity inside the die for circulation, and the slurry in the front cavity inside the die is stationary and easy to deposit, and the slurry in the slit at the lip will also dry to a certain depth.

At present, a general treatment method of domestic and foreign battery manufacturers is as follows: regardless of the case 1 or the case 2, when coating is required again after the stop, the lip is manually cleaned with a dust-free cloth and the dry slurry in the slit is dredged through a plug, and then the coating control system switches to the coating state to make the deposited and dried slurry and accumulated air inside the die eject from the lip. After manually dredging the slit and ejecting repeatedly, and confirming that the deposited and dried slurry and accumulated air inside the die are completely ejected from the lip, the lip is wiped with a dust-free cloth for cleaning to enter the coating process. This method relying on manual treatment is more complicated and needs a long cleaning time. The cleaning effect depends on the proficiency of manual technology, and there will be operational mistakes to cause equipment or personnel injury. Personnel enters a coating room and wipes with alcohol will affect temperature, humidity and cleanliness in the coating room, and there is a certain impact on coating stability and coating quality. Moreover, it is also a waste of slurry resource to eject a large amount of deposited slurry and discharge air inside the die, and it is uneconomical and wasteful to wipe with a large amount of dust-free cloths.

Energy-saving and consumption reduction and economic safety are basic principles for developing lithium battery coating equipment. There is a need to use modern science and technology to break through the technical bottleneck of improving the manual cleaning of slit extrusion type coating die for lithium battery at domestic and abroad into on-line automatic cleaning, solve key factors of long cleaning time and waste of materials and manpower, improve production efficiency and quality, and eliminate man-made errors, so as to ensure the stability of product quality and the safety of equipment and personnel.

SUMMARY

An objective of the invention is to overcome the deficiencies in the prior art, and provide an on-line automatic cleaning apparatus of slit extrusion type coating die for lithium battery and a cleaning method thereof, which can improve production efficiency, save manpower, reduce waste of material, eliminate man-made errors and thereby ensure the stability of product quality and safety of equipment and personnel.

Specifically, a technical solution for realizing the objective of the invention is that: an on-line automatic cleaning apparatus of slit extrusion type coating die for lithium battery, includes a die lip and a coating steel roller, and the die lip is arranged corresponding to a coating position of the coating steel roller. A cleaning mechanism is disposed between the die lip and the coating steel roller, and the cleaning mechanism includes a cleaning chamber; the cleaning chamber includes elongated sealing strips and a flow-guiding arc groove. Front and rear ends of the cleaning chamber are connected to an inlet sealing plate and an outlet sealing plate respectively. The elongated sealing strips are embedded or inserted in parallel on upper and lower sides of the flow-guiding arc groove respectively, and arranged corresponding to upper and lower sloped surfaces of the die lip respectively. The flow-guiding arc groove is configured (i.e., structured and arranged) to be in contact with and press the upper and lower sloped surfaces of the die lip through the elongated sealing strips to seal and thereby define a closed cleaning tunnel. The inlet sealing plate and the outlet sealing plate are embedded with sealing rings respectively, the inlet sealing plate and the outlet sealing plate are configured to be in contact with and press two opposite ends of the closed cleaning tunnel respectively for circumferential sealing, an inlet and an outlet of the closed cleaning tunnel are connected with pipes, and the pipes have solenoid valves installed thereon respectively.

In an embodiment, a lower end of the cleaning chamber is disposed with a lifting device, and a left end of the cleaning chamber is disposed with a translation device.

In an embodiment, the lifting device includes a lifting cylinder and a lifting rail, a cylinder block of the lifting cylinder is fixed onto a rack, a piston rod of the lifting cylinder is connected to the lower end of the cleaning chamber, and the cleaning chamber is slidably disposed on the lifting rail.

In an embodiment, the translation device includes a translation cylinder and a translation rail, a cylinder block of the translation cylinder is fixed onto a rack, a piston rod of the translation cylinder is connected to the left end of the cleaning chamber, and the cleaning chamber is slidably disposed on the translation rail.

In an embodiment, the inlet sealing plate and the outlet sealing plate are connected to the front and rear ends of the cleaning chamber through sealing plate movement cylinders respectively, a cylinder block of each of the sealing plate movement cylinders is fixed onto the cleaning chamber, and a piston rod of each of the sealing plate movement cylinders is connected to a corresponding one of the inlet sealing plate and the outlet sealing plate.

In another aspect, a cleaning method of an on-line automatic cleaning apparatus of slit extrusion type coating die for lithium battery, includes: during carrying out a cleaning after coating, a die lip automatically retreats away from a coating steel roller, a cleaning chamber is lifted upwards by a lifting device to reach between the die lip and the coating steel roller, the cleaning chamber, after aligning with a center of the die lip, is horizontally moved by the translation device to press upper and lower sloped surfaces of the die lip for sealing, subsequently an inlet sealing plate and an outlet sealing plate are driven by respective sealing plate movement cylinders to be in contact with and press two ends of a closed cleaning tunnel for circumferential sealing, and then the apparatus automatically opens solenoid valves to carry out cleaning procedures including die slurry circulating and periodic flushing and drying; and after a coating is required, the inlet sealing plate and the outlet sealing plate located at two ends of the cleaning chamber are driven by the respective sealing plate movement cylinders to open, the cleaning chamber is horizontally moved by the translation device to separate from the die lip (9) and then lifted downwards by the lifting device to reach below the die lip, and subsequently the die lip automatically moves close to the coating steel roller to start a new round of coating.

By adopting the above technical solutions, the invention may have beneficial effects as follows.

(1) as to the invention, after the coating is stopped, the apparatus can automatically open the respective valves to carry out cleaning procedures such as circulating of slurry inside the die (i.e., die slurry circulating) and periodic flushing and drying by blow to the die lip, which can realize no deposited slurry and air inside the die, and no dry slurry in the slit at the lip and thus the lip is clean.

(2) the invention can automatically start a cleaning process by a program, which may improve production efficiency, save manpower, reduce waste of material, shorten cleaning time, have stable cleaning effect, avoid manual operation, be safe and efficient, eliminate man-made errors, and thereby ensure the stability of product quality and the safety of equipment and personnel.

(3) the invention may be applied for cleaning of most of slits in the field of mechanical production and has strong universality.

BRIEF DESCRIPTION OF DRAWINGS

In order to make the content of the invention easier to be clearly understood, the invention will be further described in detail below according to exemplary embodiments with reference to accompanying drawings, in which.

Figure 1:
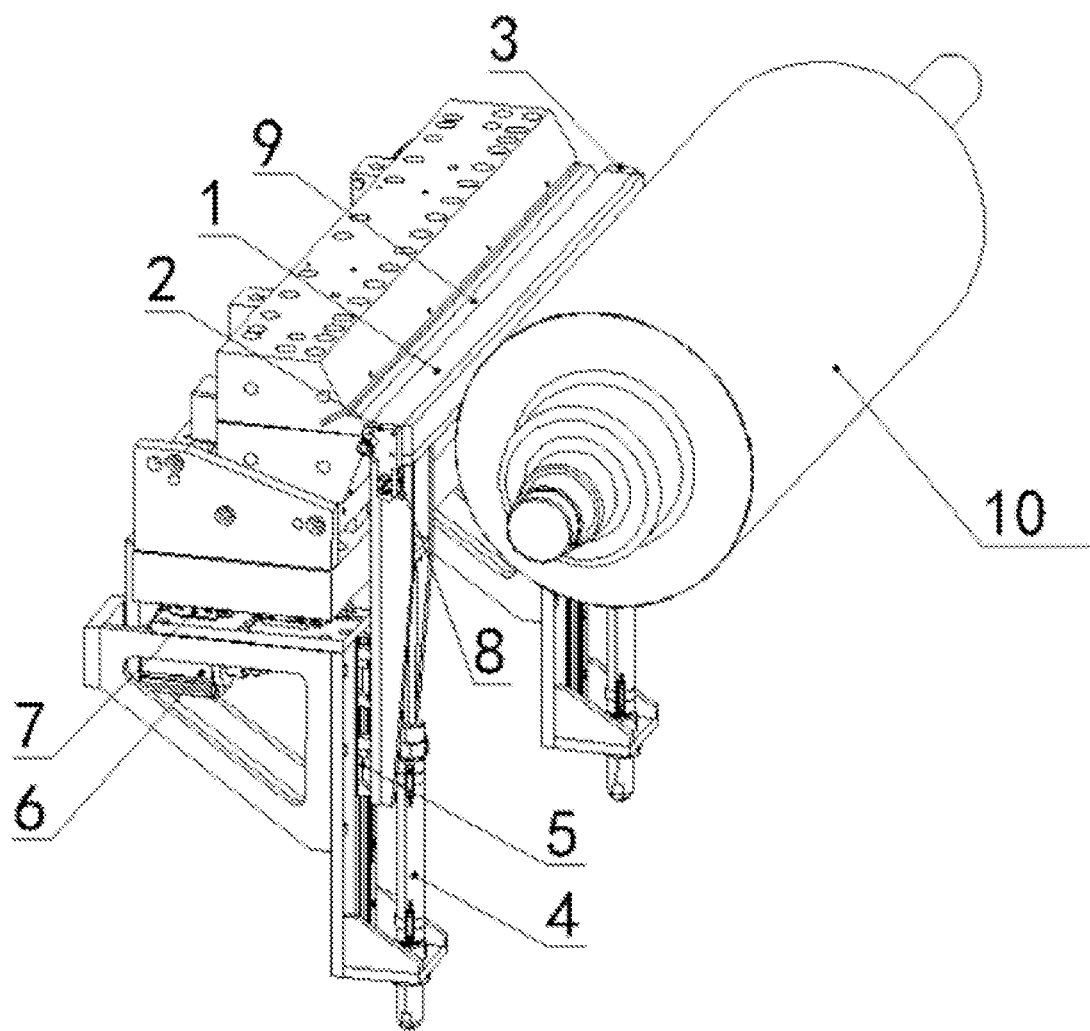
FIG. 1 is a schematic structural view of an embodiment of the invention.

Description of numeral references in the drawings: 1, cleaning chamber; 2, inlet sealing plate; 3, outlet sealing plate; 4, lifting cylinder; 5, lifting rail; 6, translation cylinder; 7, translation rail; 8, sealing plate movement cylinder; 9, die lip; 10, coating steel roller; 11, elongated sealing strip; 12, flow-guiding arc groove; 13, closed cleaning tunnel.

DETAILED DESCRIPTION OF EMBODIMENTS

Figure 2:
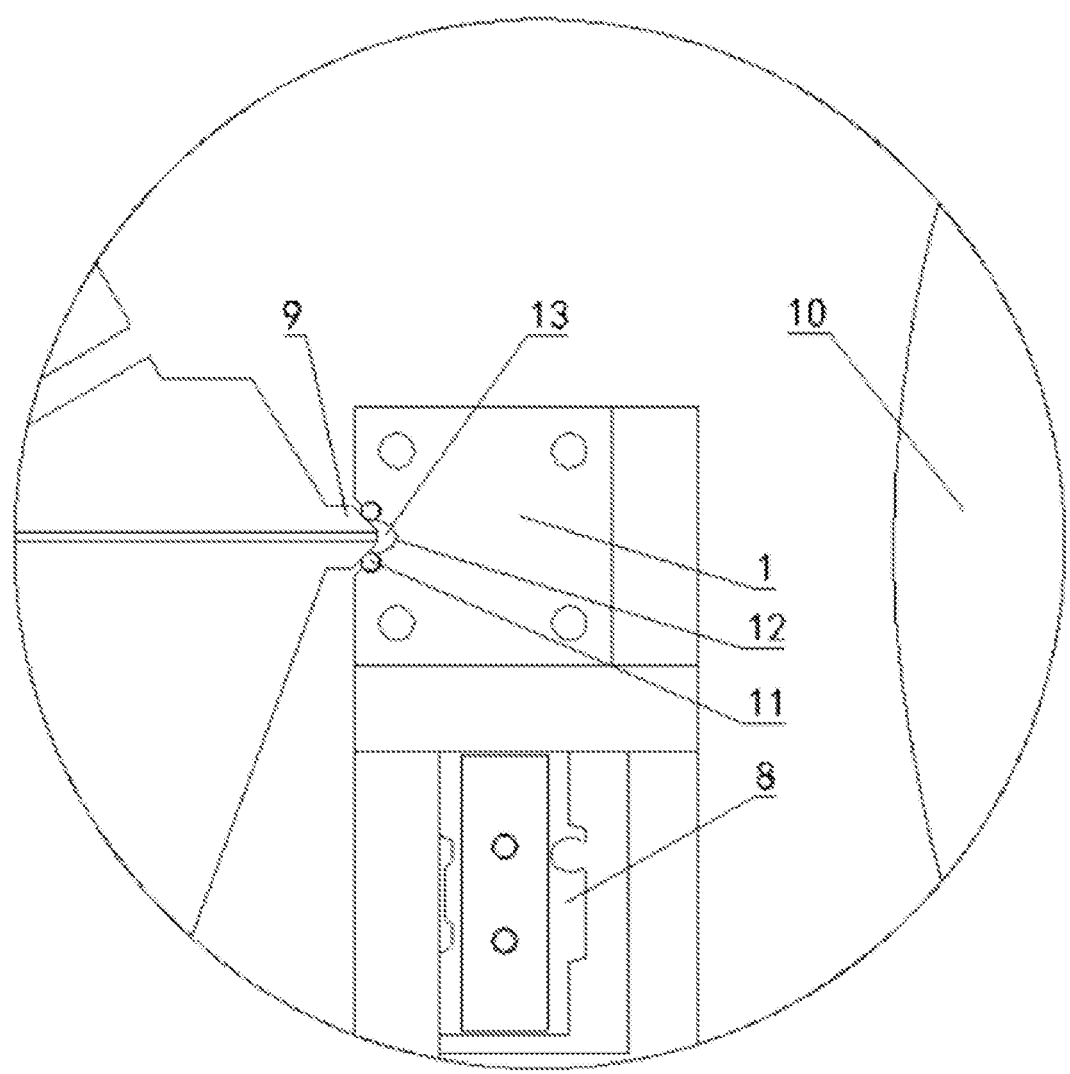
FIG. 2 is a schematic partially enlarged view of a cleaning chamber of the invention.

The invention provides an on-line automatic cleaning apparatus of slit extrusion type coating die for lithium battery. As illustrated in FIG. 1 and FIG. 2, the on-line automatic cleaning apparatus may include a cleaning chamber 1, and the cleaning chamber 1 may be composed of elongated sealing strips 11 and a flow-guiding arc groove 12. The elongated sealing strips 11 are embedded or inserted in parallel on upper and lower sides of the flow-guiding arc groove 12 respectively, and further arranged corresponding to upper and lower sloped surfaces of a die lip 9 respectively. The cleaning chamber 1 is in contact with and presses both the upper and lower sloped surfaces of the die lip 9 to seal, and thereby the die lip 9 and the flow-guiding arc groove 12 together define a closed cleaning tunnel 13. One end of the closed cleaning tunnel 13 is used as an inlet of cleaning liquid and high-pressure gas, and the other end is used as an outlet of waste discharge. The inlet and the outlet are respectively sealed by an inlet sealing plate 2 and an outlet sealing plate 3. The inlet sealing plate 2 and the outlet sealing plate 3 are embedded with sealing rings respectively. The inlet sealing plate 2 and the outlet sealing plate 3 are in contact with and press the two ends of the closed cleaning tunnel 13 respectively for circumferential sealing. The inlet and the outlet are connected with pipes, and solenoid valves are installed on the pipes. For example, two one-way solenoid valves are installed at the inlet, one of them is used to control the entry of cleaning liquid, and the other one is used to control the entry of high pressure gas; and one one-way solenoid valve is installed at the outlet to control the discharges of slurry, cleaning liquid and gas. Two groups of rail and cylinder mechanisms are disposed below the cleaning chamber 1 and configured (i.e., structured and arranged) to control lifting movement and translation movement of the cleaning chamber 1 respectively. Two ends of the cleaning chamber 1 are connected with sealing plate movement cylinders 8 respectively, and the sealing plate movement cylinders 8 are configured for controlling the inlet sealing plate 2 and the outlet sealing plate 3 to respectively apply circumferential sealing operations onto the two ends of the closed cleaning tunnel 13. The cylinders adopted in the invention may be stroke adjustable cylinders, the die lip 9 and the coating steel roller 10 are conventional devices, and automatic forward and backward of the die lip 9 are also conventional, and thus will not be described in detail herein.

A working principle of the invention is as follows.

A cleaning process is automatically started by a program, and different programs of cleaning are set according to solvent formulas, viscosities and solid contents of different slurries. The program can be easily set and realized by those skilled in the art according to actual needs.

When the coating is stopped and a cleaning is carried out, the die lip 9 automatically retreats away from the coating steel roller 10. The cleaning chamber 1 is lifted upwards to reach between the die lip 9 and the coating steel roller 10 by the lifting cylinder 4 and the lifting rail 5, and after aligning with a center of the die lip 9, the cleaning chamber 1 is horizontally moved by the translation cylinder 6 and the translation rail 7 to press the upper and lower sloped surfaces of the die lip 9 for sealing, Afterwards, the inlet sealing plate 2 and the outlet sealing plate 3 are driven by the respective sealing plate movement cylinders 8 to be in contact with and press the two ends of the closed cleaning tunnel 13 respectively for circumferential sealing, and at this time, the apparatus automatically opens the respective valves to carry out cleaning procedures of die slurry circulating and periodic flushing and drying by blow.

When a coating is required again, the inlet sealing plate 2 and outlet sealing plate 3 at the respective ends of the cleaning chamber 1 are automatically opened by the sealing plate moving cylinders 8 respectively. The cleaning chamber 1 is horizontally moved by the translation cylinder 6 and the translation rail 7 to separate from the die lip 9, and then is lifted downwards to reach below the die by the lifting cylinder 4 and the lifting rail 5. The die lip 9 automatically moves close to the coating steel roller 10 to start a new round of coating.

The invention can be configured to be periodic cleaning, and the cleaning liquid or high-pressure gas enters from one end of the closed cleaning tunnel 13 and is discharged from the other end of the closed cleaning tunnel 13. At this situation, since cavities inside the coating die are filled with a slurry, so that the cleaning liquid or high-pressure gas will not enter the coating die. In addition, the slurry overflowing from the coating die can also be temporarily stored in the closed cleaning tunnel 13, and can be flushed out by the cleaning liquid entering from one end of the closed cleaning tunnel 13 or blown out by the high-pressure gas entering from one end of the closed cleaning tunnel 13.

By the above described exemplary embodiments, the objectives, technical solutions and beneficial effects of the invention have been described in detail. It should be understood that the above description is merely exemplary embodiments of the invention and is not intended to limit the invention. Any modification, equivalent replacement, improvement, etc. made within the spirit and principle of the invention shall be included in the protection scope of the invention.

What is claimed is:

1. An on-line automatic cleaning apparatus of slit extrusion type coating die for lithium battery, comprising a die lip (9) and a coating steel roller (10);
    wherein a cleaning mechanism is disposed between the die lip (9) and the coating steel roller (10), and the cleaning mechanism comprises a cleaning chamber (1), wherein the cleaning chamber (1) comprises elongated sealing strips (11) and a flow-guiding arc groove (12), and wherein front and rear ends of the cleaning chamber (1) are connected to an inlet sealing plate and an outlet sealing plate respectively;
    wherein the elongated sealing strips (11) are embedded in parallel on upper and lower sides of the flow-guiding arc groove (12) respectively or inserted in parallel on upper and lower sides of the flow-guiding arc groove (12) respectively;
    wherein the elongated strips are arranged corresponding to upper and lower sloped surfaces of the die lip (9) respectively;
    wherein the flow-guiding arc groove (12) is configured to be in contact with and press the upper and lower sloped surfaces of the die lip (9) through the elongated sealing strips (11) to thereby define a cleaning tunnel (13);
    wherein the inlet sealing plate (2) and the outlet sealing plate (3) each comprise an embedded sealing ring, wherein the apparatus is configured to bring the inlet sealing plate (2) and the outlet sealing plate (3) into contact with and pressed against opposite ends of the tunnel after the tunnel is formed, wherein the sealing rings of the inlet sealing plate and outlet sealing plate create circumferential sealing of the tunnel to form a closed tunnel, and wherein an inlet and an outlet of the closed cleaning tunnel are each connected with a respective pipe that comprises a respective solenoid valve.

2. The on-line automatic cleaning apparatus according to claim 1, wherein a lower end of the cleaning chamber (1) is disposed with a lifting device, and a first end of the cleaning chamber (1) is disposed with a translation device.

3. The on-line automatic cleaning apparatus according to claim 2, wherein the lifting device comprises a lifting cylinder (4) and a lifting rail (5), wherein a cylinder block of the lifting cylinder (4) is fixed onto a rack, wherein a piston rod of the lifting cylinder (4) is connected to the lower end of the cleaning chamber (1), and wherein the cleaning chamber (1) is slidably disposed on the lifting rail (5).

4. The on-line automatic cleaning apparatus according to claim 2, wherein the translation device comprises a translation cylinder (6) and a translation rail (7), wherein a cylinder block of the translation cylinder (6) is fixed onto a rack, wherein a piston rod of the translation cylinder (6) is connected to the first end of the cleaning chamber (1), and wherein the cleaning chamber (1) is slidably disposed on the translation rail (7).

5. The on-line automatic cleaning apparatus according to claim 1, wherein the inlet sealing plate (2) and the outlet sealing plate (3) are connected to the front and rear ends of the cleaning chamber (1) through sealing plate movement cylinders (8) respectively, wherein a cylinder block of each of the sealing plate movement cylinders (8) is fixed onto the cleaning chamber (1), and wherein a piston rod of each of the sealing plate movement cylinders (8) is connected to a corresponding one of the inlet sealing plate (2) and the outlet sealing plate (3).

6. The on-line automatic cleaning apparatus according to claim 2, wherein the inlet sealing plate (2) and the outlet sealing plate (3) are connected to the front and rear ends of the cleaning chamber (1) through sealing plate movement cylinders (8) respectively, wherein a cylinder block of each of the sealing plate movement cylinders (8) is fixed onto the cleaning chamber (1), and wherein a piston rod of each of the sealing plate movement cylinders (8) is connected to a corresponding one of the inlet sealing plate (2) and the outlet sealing plate (3).

7. The on-line automatic cleaning apparatus according to claim 3, wherein the inlet sealing plate (2) and the outlet sealing plate (3) are connected to the front and rear ends of the cleaning chamber (1) through sealing plate movement cylinders (8) respectively, wherein a cylinder block of each of the sealing plate movement cylinders (8) is fixed onto the cleaning chamber (1), and wherein a piston rod of each of the sealing plate movement cylinders (8) is connected to a corresponding one of the inlet sealing plate (2) and the outlet sealing plate (3).

8. The on-line automatic cleaning apparatus according to claim 4, wherein the inlet sealing plate (2) and the outlet sealing plate (3) are connected to the front and rear ends of the cleaning chamber (1) through sealing plate movement cylinders (8) respectively, wherein a cylinder block of each of the sealing plate movement cylinders (8) is fixed onto the cleaning chamber (1), and wherein a piston rod of each of the sealing plate movement cylinders (8) is connected to a corresponding one of the inlet sealing plate (2) and the outlet sealing plate (3).

9. The on-line automatic cleaning apparatus according to claim 1, wherein each of the solenoid valves is a one-way solenoid valve.

10. A cleaning method of the on-line automatic cleaning apparatus according to claim 6, comprising:

during carrying out of a cleaning after coating, the die lip (9) automatically retreats away from the coating steel roller (10), the cleaning chamber (1) is lifted upwards by the lifting device to reach between the die lip (9) and the coating steel roller (10), and the cleaning chamber (1), after aligning with a center of the die lip (9), is horizontally moved by the translation device to press the upper and lower sloped surfaces of the die lip (9) for sealing, and subsequently the inlet sealing plate (2) and the outlet sealing plate (3) are driven by the respective sealing plate movement cylinders (8) to be in contact with and press two ends of the cleaning tunnel (13) for circumferential sealing, and then the apparatus automatically opens the solenoid valves to carry out cleaning procedures including die slurry circulating and periodic flushing and drying; and after a coating is required, the inlet sealing plate (2) and the outlet sealing plate (3) located at ends of the cleaning chamber (1) are driven by the respective sealing plate movement cylinders (8) to open, the cleaning chamber (1) is horizontally moved by the translation device to separate from the die lip (9) and then lifted downwards by the lifting device to reach below the die lip (9), and subsequently the die lip (9) automatically moves close to the coating steel roller (10) to start a new round of coating.

* * * * *